(12) United States Patent
Phibbs, Jr. et al.

(10) Patent No.: US 8,793,244 B2
(45) Date of Patent: Jul. 29, 2014

(54) DATA STORE LIST GENERATION AND MANAGEMENT

(75) Inventors: Paul H. Phibbs, Jr., Escondido, CA (US); Thomas Kevin Ryan, Valley Center, CA (US); Linette Draper, Escondido, CA (US)

(73) Assignee: Teradata US, Inc., Dayton, OH (US)

( * ) Notice: Subject to any disclaimer, the term of this patent is extended or adjusted under 35 U.S.C. 154(b) by 837 days.

(21) Appl. No.: 11/646,655

(22) Filed: Dec. 28, 2006

(65) Prior Publication Data

US 2007/0244871 A1 Oct. 18, 2007

Related U.S. Application Data

(60) Provisional application No. 60/792,406, filed on Apr. 17, 2006.

(51) Int. Cl.
  *G06F 7/00* (2006.01)
  *G06F 17/30* (2006.01)

(52) U.S. Cl.
  USPC .......................... 707/722; 707/705; 707/706

(58) Field of Classification Search
  None
  See application file for complete search history.

(56) References Cited

U.S. PATENT DOCUMENTS

| | | |
|---|---|---|
| 5,495,567 A | 2/1996 | Iizawa et al. |
| 5,519,859 A | 5/1996 | Grace |
| 5,664,173 A | 9/1997 | Fast |
| 5,806,057 A * | 9/1998 | Gormley et al. ................ 707/1 |
| 5,884,298 A | 3/1999 | Smith, II et al. |
| 5,924,090 A | 7/1999 | Krellenstein |
| 5,926,797 A | 7/1999 | Goodwin, III |
| 6,341,282 B1 * | 1/2002 | Sharpe et al. ................ 707/3 |
| 6,405,192 B1 | 6/2002 | Brown et al. |
| 6,571,251 B1 * | 5/2003 | Koski et al. ................ 707/102 |
| 6,578,028 B2 | 6/2003 | Egilsson et al. |
| 6,748,374 B1 | 6/2004 | Madan et al. |
| 6,938,034 B1 | 8/2005 | Kraft et al. |
| 7,007,294 B1 | 2/2006 | Kurapati |
| 7,131,060 B1 | 10/2006 | Azuma |
| 7,231,612 B1 * | 6/2007 | Mani et al. ................ 707/2 |
| 7,587,363 B2 * | 9/2009 | Cataline et al. ................ 705/40 |
| 8,005,704 B2 * | 8/2011 | MacFarlane et al. ......... 705/7.21 |
| 2002/0007362 A1 * | 1/2002 | Collins et al. ................ 707/5 |
| 2002/0152190 A1 * | 10/2002 | Biebesheimer et al. .......... 707/1 |
| 2002/0180791 A1 | 12/2002 | Broussard et al. |
| 2003/0182278 A1 | 9/2003 | Valk |
| 2004/0098383 A1 * | 5/2004 | Tabellion et al. ................ 707/3 |
| 2004/0215531 A1 | 10/2004 | Stashluk et al. |
| 2005/0010877 A1 | 1/2005 | Udler |
| 2005/0091205 A1 * | 4/2005 | Sidlosky et al. ................ 707/3 |

(Continued)

OTHER PUBLICATIONS

"U.S. Appl. No. 11/787,472, Non Final Office mailed Jun. 10, 2009", 10 pgs.

"U.S. Appl. No. 11/787,472, Response filed Sep. 10, 2009 to Non Final Office Action mailed Jun. 10, 2009", 9 pgs.

(Continued)

*Primary Examiner* — Fred I Ehichioya
*Assistant Examiner* — Jau-Shya Meng
(74) *Attorney, Agent, or Firm* — Schwegman, Lundberg & Woessner, P.A.

(57) ABSTRACT

Techniques for data store list generation and management are provided. A user supplies criteria for a list via a graphical user interface tool. The criteria are used to generate a query, and the query when executed against a data store produces results representing the list. The list may then be used for a variety of purposes.

3 Claims, 3 Drawing Sheets

(56) References Cited

U.S. PATENT DOCUMENTS

| | | | |
|---|---|---|---|
| 2005/0187794 A1* | 8/2005 | Kimak | 705/3 |
| 2005/0289106 A1* | 12/2005 | Petri et al. | 707/1 |
| 2006/0136396 A1 | 6/2006 | Brobst | |
| 2006/0136419 A1* | 6/2006 | Brydon et al. | 707/9 |
| 2007/0185826 A1* | 8/2007 | Brice et al. | 707/1 |
| 2009/0070301 A1 | 3/2009 | McLean et al. | |

OTHER PUBLICATIONS

"U.S. Appl. No. 11/787,472, Advisory Action mailed Jun. 25, 2010", 3 pgs.

"U.S. Appl. No. 11/787,472, Non Final Office Action mailed Mar. 24, 2011", 15 pgs.

"U.S. Appl. No. 11/787,472, Response filed Jun. 27, 2011 to Non Final Office Action mailed Mar. 24, 2011", 8 pgs.

\* cited by examiner

DATA STORE LIST GENERATION AND MANAGEMENT

CROSS-REFERENCE TO RELATED APPLICATIONS

This application claims the benefit of priority to U.S. Provisional Patent Application No. 60/792,406, filed Apr. 17, 2006, which is hereby incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example source code as described below and in any drawings hereto: Copyright® 2006, NCR Corp. of Dayton, Ohio—All Rights Reserved.

FIELD

The invention relates generally to data store processing and more particularly to techniques for generating and managing data store lists.

BACKGROUND

Enterprises are increasingly capturing, storing, and mining a plethora of information related to communications with their customers. Often this information is stored and indexed within databases. Once the information is indexed, queries are developed on an as-needed basis to mine the information from the database for a variety of organizational goals, such as to produce customer lists or labels.

Generally, when an analyst wants to generate a specific list or set of labels from a database, the analyst submits a set of criteria to query specialists. The query specialists than produces the necessary SQL to execute a query against the database and the analyst may subsequently process the query as needed.

There are several inefficiencies associated with this process. First, the analyst is the individual most knowledgeable as to what the analyst wants and if the analyst misses something or does not appreciate the techniques used by the query specialists, then there may be several iterations with the query specialists before the desired list or set of labels can be produced.

Second, the query specialists often serve many analyst within an enterprise and the query specialists probably has many other responsibilities within an enterprise. As a result, the analyst may not receive his/her query in a timely fashion. Thus, the analyst may be idle for a period of time waiting on the query to proceed or the analyst may miss a business opportunity when the query is time sensitive. The request from the analyst also adds to the workload of an already likely loaded search specialist.

Additionally, the analyst may have a specific amount or number of individuals that the analyst wants to have in the list or set of labels. That is, the analyst may only be able to handle a predefined number of individuals or may only want a certain number of customers. If the query returns more than this desired amount, then the analyst may have to submit a revised request to the search specialists. Conversely, the analyst may receive too few individuals in the search query results and may want to alter the search query, which is developed by the query specialist, to increase the individuals in the list or set of labels. Thus, the process of obtaining the desired size for a list or set of labels can result in unnecessary iterations between the analyst and the search specialist, which can further delay the needs of the analyst and the enterprise.

Thus, it can be seen that improved mechanisms, tools, and/or interfaces for producing lists and labels are desirable.

SUMMARY

In various embodiments, techniques for generating and managing data store lists are presented. According to an embodiment, a method for generating a data store query for use in producing a list is presented. A type of job to process is received along with one or more search criteria. Next, a query is generated to perform the type of job against a data store; the query is circumscribed by the one or more search criteria.

DETAILED DESCRIPTION

Figure 1:
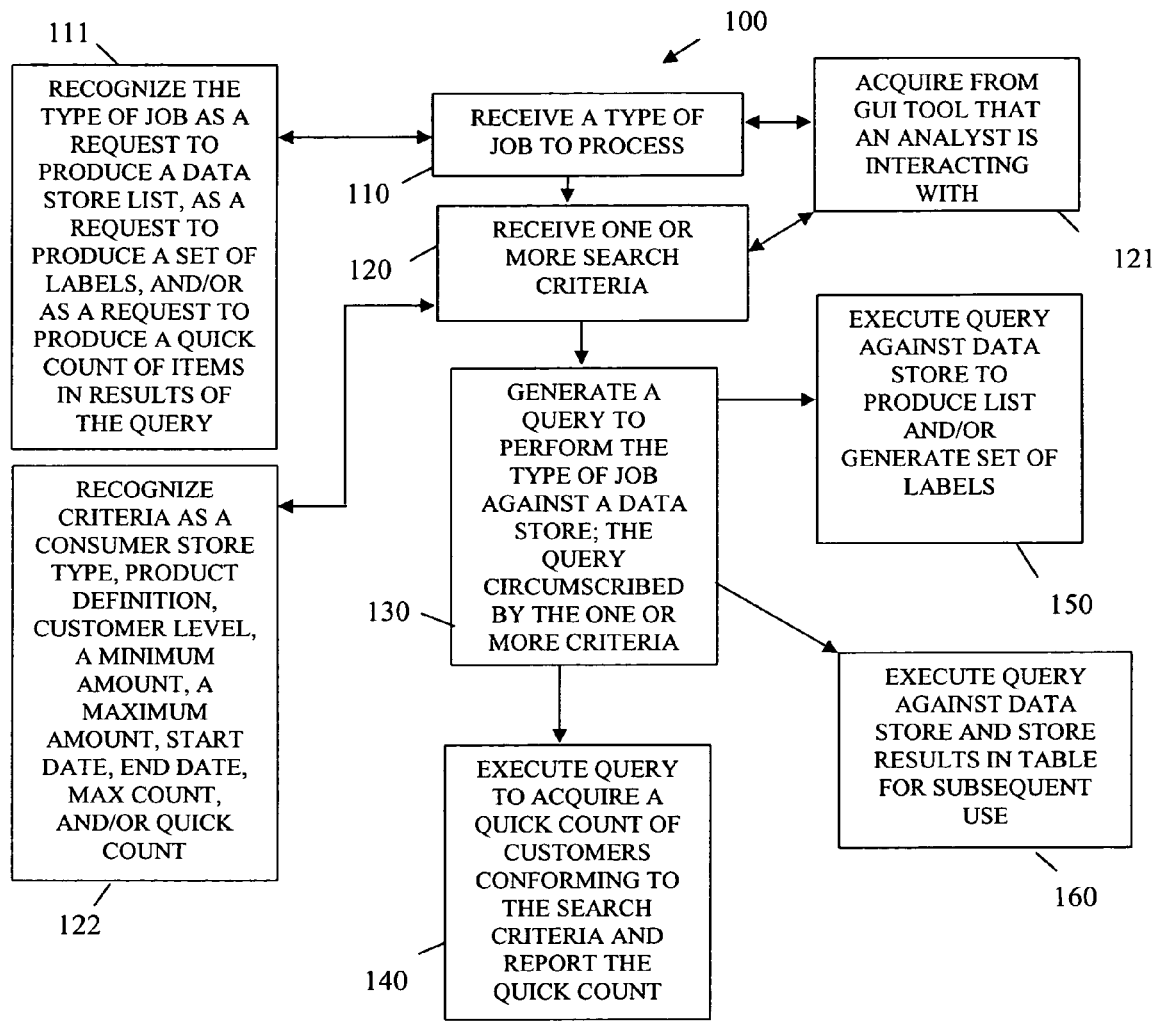
FIG. 1 is a diagram of a method for generating a data store query for use in producing a list, according to an example embodiment.

FIG. 1 is a diagram of a method 100 for generating a data store query for use in producing a list, according to an example embodiment. The method 100 (hereinafter "query generation service") is implemented in a machine-accessible or computer-readable medium as instructions that when executed by a machine (processing device) performs the processing depicted in FIG. 1. Moreover, the query generation service is optionally accessible over a network. The network may be wired, wireless, or a combination of wired and wireless.

A "data store" as used herein may include a database, a collection of databases organized as a data warehouse, a directory, a collection of directories cooperating with one another, or various combinations of the same. According to an embodiment, the data store is a Teradata® warehouse product or service distributed by NCR Corporation of Dayton, Ohio.

A "list" as used herein may include any selective group of information acquired from a data store. For example, a list may be a set of customer identifiers associated with some predefined criteria. The criteria when embodied as a search query can be executed against the data store to return the list. It is understood that the list may include other types of information beyond just customer identifiers or numbers, such as product identifiers, store identifiers, etc.

A "set of labels" as used herein may include information that includes names and addresses. Each name and address pair is a label within the set of labels. The set of labels may be viewed as one type of list. Moreover, the list may include more information than is necessary to produce a set of labels, such as phone numbers, transaction history, etc.

It is within this context that the processing associated with the custom analysis interface service is now described in detail with reference to the FIG. 1.

At 110, the query generation service receives a type of job to process. A job type identifies what it is that is to be represented in the search query, which the query generation service produces eventually as discussed below. According to an embodiment, at 111, the query generation service recognizes three types of job. The first type of job is a request to produce a list as the search query. The second type of job is a request to produce a set of labels (type of list as discussed above). The third type of job is a request to produce a quick count to identify the total number or count of the items produced when the query executes.

It is also noted that the job type may be any combination of these three. So, the job type may identify a request for a list, a request for a set of labels, and a request to produce a quick count. In fact, any permutation of the three different job types may be achieved and recognized as a type of job.

At 120, the query generation service receives one or more search criteria. The search criteria when combined with the type of job are used to produce the query below.

In an embodiment, at 121, the type of job and the one or more search criteria are received interactively from a user or analyst via a graphical user interface (GUI) tool. The analyst does not have to be a search specialists or programmer; rather the analyst/user may be someone with no knowledge of programming or data store searching techniques. The type of job and each of the one or more search criteria may have been received via dynamically supplied selections within the GUI tool. So, the analyst/user does not have to remember or manually input any specific information from scratch; rather, the user may be presented with selections and once the selections are made values are assigned to the type of job and the one or more search criteria and then this is supplied and received by the query generation service for processing.

In an embodiment, at 122, the query generation service recognizes the one or more criteria as one or more of the following: a customer store type, a product definition, a customer level, a maximum amount, a minimum amount, a requested start date, a requested end date, a maximum count, and/or a quick count.

The customer store type is represented as a code that identifies whether the customer's store is the customer's usual or most frequent store shopped by the customer, store of residence for the customer, or both usual store and residence store.

The product definition may include three retail values that a user can select (Division, Group, and/or Department). The product definition may also be associated with Boolean logic, such that each retail value may be combined in manners with one another to form the product definition using AND, OR, or NOT IN. This permits highly detailed lists of specific customers.

The customer level permits the user to select multiple customers if the retail establishment using the query generation service has set up, within its data store, the ability to have customers organized in levels. This may be done with customer loyalty programs, where certain customers may be associated with different award levels within the loyalty program. Thus, with the customer level criteria a user can select one level of customers, multiple levels of customers, or even all levels of customers.

The minimum amount refers to a minimum amount of purchase made by customers for some other criteria. So, as an example the other criteria may be customers shopping at a certain store over the last year and the minimum amount may be defined as $100.

Similar to the minimum amount, the maximum amount permits other conditions to be combined with a maximum amount that customers purchased within other criteria.

The requested start date represents the beginning date for which the other criteria is to be obtained in the query that the query generation service produces. The requested end date represents the ending date for which the other criteria is to be obtained in the query. In some cases, the requested start date may appear without the requested end data and vice versa.

The maximum count may be used for the user to select a maximum number of customers that the user wants to obtain with the query that the query generation service generates. The order of the customers returned by the query may also be defined with other criteria and depending upon the order (such as maximum purchase amount) any remaining customers acquired when executing the query against the data store are dropped.

The quick count may be used by the user to obtain a total number of customers or items in a list that is produced when the query is executed. The user may also elect to keep the list with the quick count or may elect to acquire the quick count in combination with keeping the list. Examples of quick count usage are described more completely below.

There may also be other criteria used, such as inactive customers. These are customers that have had no purchases or activity within some predefined period. So, a user may elect to include or exclude inactive customers.

The criteria is used by the query generation service in combination with the type of job to generate a query that when executed produces the list desired by a user.

Accordingly, at 130, the query generation service uses the type of job and the one or more search criteria to generate a query that can be executed against a data store. The query is circumscribed to the one or more search criteria.

In some cases, at 140, the query generation service may initially pre-execute the query on behalf of the user to acquire a quick count. The quick count represents a total number of customers that are returned when the query executes. The results of the query are the list. The list may or may not also be retained with the pre-execution. In other words, the user may have wanted the quick count before any decision is made as to whether the list is to be retained. The user may be interactively building the proper list and when the proper list and number of customers are obtained, the user may then elect to keep the list.

According to an embodiment, at 150, the query generation service may execute the query for a variety of reasons on behalf of the user. For example, the query may be executed to produce a list. The list may be further used to generate a desired set of labels.

At 160, the query generation service may be configured or directed to execute the query, which it generated, against a data store and the results, which represent a list, may then be stored in a table for subsequent use and manipulation by the user or other services.

It is now appreciated how criteria may be supplied to automatically generate a search query. The search query when executed against a data store produces a list or items. In some cases, selective information from the list may be further used to generate a custom set of labels. This automates the list generation and management and eliminates the need to have search specialists develop queries on behalf of users or analysts. Various enhancements and further details associated with these techniques are described more completely below with reference to the FIGS. 2 and 3.

Figure 2:
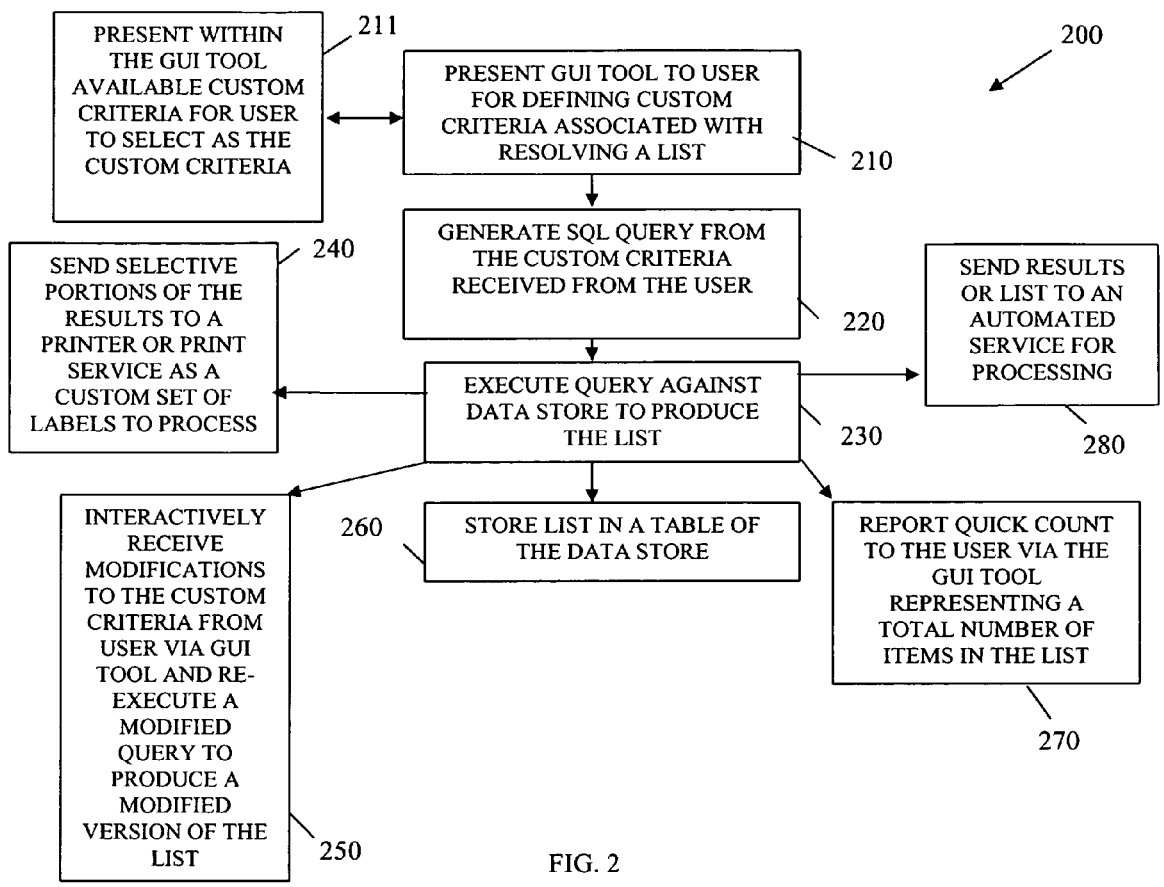
FIG. 2 is a diagram of a method for interacting with a user to produce a data store list, according to an example embodiment.

FIG. 2 is a diagram of a method 200 for interacting with a user to produce a data store list, according to an example embodiment. The method 200 (hereinafter "user list generation service") is implemented in a machine-accessible and readable medium as instructions that when executed by a machine performs the processing reflected in FIG. 2. The user list generation service may also be accessible over a network. The network may be wired, wireless, or a combination of wired and wireless. The user list generation service presents an alternative and in some cases an enhanced processing perspective to the query generation service represented by the method 100 of the FIG. 1.

At 210, the user list generation service presents a graphical user interface (GUI) tool to a user. The GUI tool is used by or interacted with by the user to define custom criteria associated with resolving or determining a list from a data store. Examples of different types of criteria were described above in detail with reference to the method 100 of the FIG. 1.

According to an embodiment, at 211, the user list generation service presents available custom criteria for the user to select as the custom criteria discussed above at 210. The GUI tool includes a variety of input and selection fields. Each field is associated with a type or criterion, and the user can select one of several available criterion values from a list or by browsing a table that pops up to populate that field with a specific custom criterion value.

At 220, the user list generation service generates a SQL query from the custom criteria received via the GUI tool from the user. That is, the custom criteria provide the parameters and logic from which the user list generation service may generate an SQL query. The SQL query is subsequently executed to produce a list desired by the user. Example processing logic to generate the SQL is presented below with the sample source code for an example implementation. It is noted that other approaches similar to what is presented below may be used as well without departing from the teachings presented here.

At 230, the user list generation service executes the query against a data store to produce a list desired and defined by the user via the GUI tool.

According to an embodiment, at 240, the user list generation service may send selective portions of the results (list) to a printer or print service as a custom set of labels to process. The selective portions may be information relevant to a label, such as name and address.

In another embodiment, at 250, the user list generation service may interactively receive modifications to the original custom criteria from the user via the GUI tool. The modified custom criteria are used to generate a modified SQL query, which is executed against the data store. The result of executing the modified SQL query is a production of a modified version of the list. This illustrates that the user may interactively work with the GUI tool to instruct the user list generation service to ultimately produce the desired list, which the user wants to achieve.

At 260, the user list generation service may store the results (list) in a table of the data store. The list may then be manipulated and used from the data store in a manner desired by the user. Alternatively, the list may be consumed or supplied to an automated service for subsequent processing, such as for production of a set of labels desired by the user, and the like.

In some cases, at 270, the user list generation service may report a quick count to the user via the GUI tool. The quick count represents the total number of items that is included in the list once the query is executed. Essentially, the quick count is a count of the items that appear in the list. The user may elect to retain the list or scrap the list in response to the quick count.

According to an embodiment, at 280, the list (results) from executing the query may be sent to an automated service for subsequent processing. That is, the list does not have to be strictly used for purposes of create a set of labels. The list may also be consumed by other automated applications.

It is now appreciated how a user may interact with a GUI tool that also communicates with the user list generation service. The use supplied custom criteria for a desired list. In response to the custom criteria, the user list generation service generates a SQL query and executes the query. The results represent the list. The list can then be used for a variety of purposes may even be stored in a data store for subsequent manipulation and use.

Figure 3:
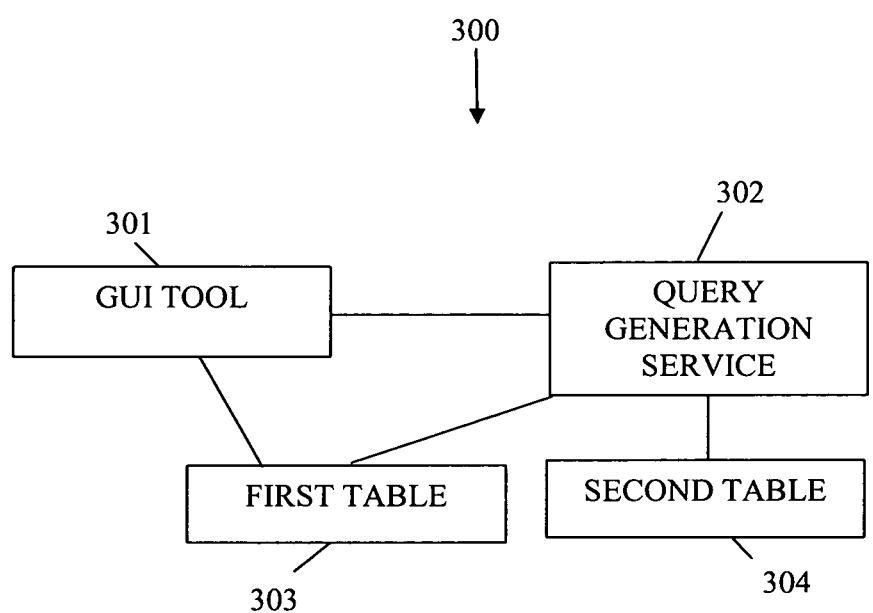
FIG. 3 is a diagram of a list generation and management system, according to an example embodiment.

FIG. 3 is a diagram of a list generation and management system 300, according to an example embodiment. The list generation and management system 300 is implemented in a machine-accessible and readable medium and is operational over a network. The network may be wired, wireless, or a combination of wired and wireless. In an embodiment, portions of the list generation and management system 300 implements, among other things the query generation service and user list generation service represented by the methods 100 and 200 of the FIGS. 1 and 2, respectively.

The list generation and management system 300 includes a graphical user interface (GUI) tool 301 and a query generation service 302. In some embodiments, the list generation and management system 300 may also include a first table 303 and a second table 304. Each of these and their interactions with one another will now be discussed in turn.

The GUI tool 301 presents a variety of fields to the user. The user selects specific criteria for one or more of the fields and once submitted via another option in the GUI tool 301, the selected criteria or criterion is supplied to the query generation service 302.

According to an embodiment, the GUI tool 301 may also provide a selection of criterion values for each criterion type associated with each field. Example criteria types were discussed above with reference to the method 100 of the FIG. 1. The criterion values for each criterion type may be dynamically acquired and populated or supplied as a popup to the user via a first table 303. Thus, the criterion values can be easily managed and changed and added for new fields that are presented in the GUI tool 301. This is because the values are acquired from a separately managed first table. Thus, execution logic associated with the GUI tool 301 does not have to be dependent on the criterion values that are presented to the user, since these may be acquired via the first table 303.

The GUI tool 301 permits the user to interactively define his/her desired list using predefined and descriptive fields and perhaps using selectable values for the criteria associated with the fields. This means that the user does not have to be excessively technical and may be an analyst entirely unfamiliar with data stores and query languages. Essentially, the traditional query specialist is not longer needed and the turnaround time to produce a user desired lists is substantially reduced and near real time. Plus, the user can iterate until the desired list until the desired number of list items are obtained.

The query generation service 302 uses the criteria values acquired from the GUI tool 301 to generate a query in a data store query language, such as SQL. When the query is executed against the data store the user's desired list is produced or created having a number of items. In some cases, the items are names of customer and may include records or other information associated with each customer. Selective information associated with each item of the list may be used to produce or generate a set of labels.

According to an embodiment, the list generation and management system 300 may also produce and populate a second table 304 within the data store. The second table 304 is used to house the results (list) from executing the query. This permits the items of the list to be subsequently used, manipulated, and viewed by the user.

According to an embodiment, the query generation service 302 may execute the query on behalf of the user and produce one or more different selectable data store views of the results (list) for the user to inspect or view. So, custom views may be provided to the user for the list generated by executing the query against the data store using the user-defined criteria.

In some cases, the query generation service 302 may also pre-execute the query to produce the list and then count the items of the list to produce a quick count. The quick count may be populated to a selective field of the GUI tool 301 for the user to inspect of view. The user may or may not have requested the quick count. In other words, the user may instruct via the GUI tool 301 for a quick count to be produced by the query generation service 302 or the query generation service 302 may produce the quick count based on a profile of the user or based on configuration settings of the GUI tool 301 or even the query generation service.

The query generation service 302 may even be used to validate criteria selected by the user or various combinations of specific criteria before attempting to generate the query. In other words, the syntax or values of the criteria and even particular combinations may not be valid, and the query generation service 302 may inspect this and inform the user via the GUI tool 301 of the detected problems for the user to fix before the query generation service 302 generates the query.

The methods 100 and 200 and the system 300 describe how lists may be generated and managed in an automated fashion. These lists may in some cases be used for purposes of generating and processing labels associated with customers of an enterprise.

In an example embodiment, the techniques presented herein may be implemented using the Teradata® warehouse distributed by NCR, Corporation of Dayton, Ohio. A particular example may include three primary software modules. The first referred to as SpLnL_Cr8 creates necessary tables to implement lists and labels in an automated fashion. The second is referred to as SpLnL_Ins loads seed data necessary to use the lists and labels. The third is referred to as SpLnL_SQL manages generation and execution of the SQL used to acquire the lists and labels.

The following example software instructions may be used to implement the above-mentioned features of the disclosure as well as other features within the context of a three primary software modules mentioned above.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processing device-implemented method for executing on a processing device, the method comprising:
   receiving, by the processing device, a type of job to process, the type of job includes a query request and a query that executes in response to the query request produces a list that conforms to one or more search criteria, the query produces a set of labels that conforms to the one or more search criteria, and the query produces a query count of items that conforms to the one or more search criteria, and the query count of items represents a total number of labels returned with the query, each label includes a name and an address for a particular customer;
   wherein the search criteria including a customer level and a maximum count, the customer level representing an award level within a loyalty program, and the maximum count representing a maximum number of customers that the user specifies for a SQL query to return;
   wherein receiving the type of job and the one or more search criteria further includes acquiring the type of job and the one or more search criteria from a graphical user interface (GUI) tool that an analyst is interacting with to produce the query, and wherein available types of jobs and available criteria are presented with the QUI tool for the user to select;
   receiving, by the processing device, the one or more search criteria, the one or more search criteria interactively received from a user and the one or more search criteria includes specific criteria that excludes those customers identified in the produced list that have had no purchases or activity within a predefined period;
   generating, by the processing device, the query to perform the type of job against a data store circumscribed by the one or more search criteria; and
   executing, on the processing device, the query to acquire a count for a total number of customers that conform to the one or more search criteria and reporting the count for the total number of the customers to the user without retaining the list, and user to decide whether to retain the list and the user continues to interactively build on the list via modification to the one or more search criteria with the list being retained once the user has a user-desired total number of customers for the count as defined in modifications interactively made via the GUI tool to the one or more search criteria; wherein the retaining comprising storing results of the query in a table of the data store for subsequent use.

2. The method of claim 1, wherein receiving the one or more search criteria further includes recognizing the one or more search criteria as: a consumer store type, a product definition, a minimum amount, a requested start date, a requested end date, and a quick count to identify a number of customers that conform to the one or more search criteria.

3. The method of claim 1, further comprising one or more of the following:
   executing, on the processing device, the query against the data store and producing the list; and generating, by the processing device, the set of labels representing selective information from results of executing the query.

\* \* \* \* \*